Jan. 12, 1971    R. H. FELDHAKE    3,554,813
METHOD FOR SEALING AN ELECTROCHEMICAL CELL
Filed Feb. 7, 1969

INVENTOR.
Ralph H. Feldhake

United States Patent Office 3,554,813
Patented Jan. 12, 1971

3,554,813
METHOD FOR SEALING AN ELECTROCHEMICAL CELL
Ralph H. Feldhake, Verona, Wis., assignor to ESB Incorporated, a corporation of Delaware
Filed Feb. 7, 1969, Ser. No. 797,576
Int. Cl. H01m 1/00, 1/02
U.S. Cl. 136—133           4 Claims

ABSTRACT OF THE DISCLOSURE

An electrochemical cell having a cylindrical metallic container sealed by a hard plastic closure made from a cold-flow resistant plastic, e.g. nylon. The plastic closure is radially compressed by pushing it through a reducing die and into the metallic container. The plastic closure expands in the container with such force that the upper edge of the container is slightly deformed outwardly. The upper edge of the container is crimped over upon the top of the closure by means of a closing die which axially compresses the closure between the upper edge of the container and a bead rolled into the container. The axial compression develops an axial force in the plastic closure, increases the radial force exerted by the plastic closure upon the container, and the compression of the upper edge of the container upon the closure increases the sealing surface by forming both an axial and radial sealing area.

BACKGROUND OF THE INVENTION

It is well known in the electric battery art that an alkaline cell is very difficult to seal against electrolyte leakage. Alkaline electrolyte has a unique capability for wetting a surface which enables it to creep along the surface. Electrolyte creepage appears to be facilitated when the surface is polarized such as occurs in an electric battery. It is essential to prevent electrolyte leakage in a battery, for the battery capacity may be reduced or battery performance may otherwise be impaired, the electrolyte may corrode the apparatus or device in which the battery is used, and electrolyte on the surface of a battery makes it appear to be defective and makes it dangerous to handle.

Many attempts have been made to improve the sealing means of alkaline batteries, but there is still a need for a truly leakproof alkaline battery. One improvement in sealing means for alkaline batteries is disclosed in U.S. Pat. No. 3,069,489. The method disclosed in this patent employs a solely radial compressive force to compress a plastic sealing gasket between the battery container and the battery cover.

SUMMARY OF THE INVENTION

It is the general purpose of this invention to provide an improved method for sealing an electrochemical cell, particularly the type employing an alkaline electrolyte. The cell container is metallic and generally has a cylindrical shape, i.e. a circular horizontal cross-section. The container has one open end which is closed by means of a hard plastic closure which may also contain a metallic terminal member. The plastic closure has a diameter larger than the diameter of the container opening, and the sealing method of this invention comprises radially compressing the closure to a diameter smaller than that of the container opening by pushing the closure through a reducing die. The plastic closure is pushed out of the reducing die and into the top of the container where it expands into contact with the container with such force that the upper edge of the container is slightly deformed outwardly. After the plastic closure is inserted into the container, the upper edge of the container which extends above the closure is crimped over upon the top of the closure by means of a closing die which axially compresses the plastic closure between the upper edge of the container and a bead formed in the container upon which the bottom of the closure rests. This axial compression develops an axial force in the plastic closure and also increases the radial force exerted by the plastic closure upon the container wall. The crimping of the top edge of the container upon the plastic closure increases the sealing surface between the container and the closure whereby there is a greater sealed area, and in this manner a more effective seal is produced.

DESCRIPTION OF THE PREFERRED EMBODIMENT

An electrochemical cell can be effectively sealed against electrolyte leakage by using a plastic closure member to seal a cylindrical metallic container having an open top. The plastic closure member is made from a material which is not corroded by alkaline electrolyte, and most importantly, a material having a high compressive and shear strength and capable of withstanding large forces without a distortion in shape caused by cold-flow. An example of a suitable material is a hard nylon composition commercially available under the trademark "Zytel." Other cold-flow resistant plastics such as hard polyethylene may also be used.

It is particularly preferred that the plastic closure member contain a metal insert to reinforce and strengthen the closure, though this is not essential. It has been found that some types of electrochemical cells develop substantial internal pressures which may cause the plastic closure to bulge, and in these cells, it may be necessary to use a plastic closure having a metal insert. The plastic closure member also contains a metallic terminal member which makes electrical contact with the electrode of opposite polarity to the electrode in electrical contact with the container.

The metallic container may be made from a steel sheet or nickel-plated steel which is drawn into a cylindrical container having an open top. The thickness of the steel sheet may range from about 8 to about 20 mils, though this is a matter of choice. Near the top of the container but spaced substantially from the top edge, a bead is rolled into the container to function as a support for the plastic closure. When the top edge of the container is crimped over upon the plastic closure, the bead supports the closure and enables an axial compressive force to be developed in the plastic closure in addition to a radial force developed in the closure by compressing it prior to inserting it into the container.

Figure 1:
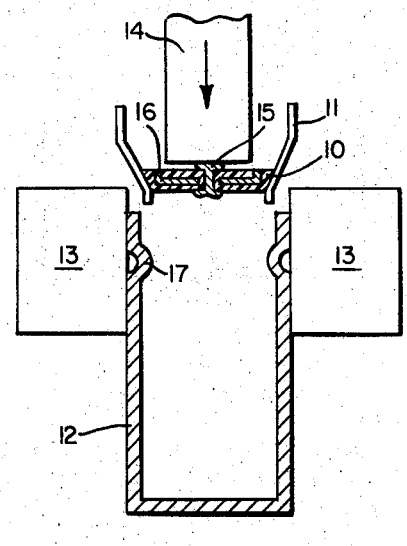
FIG. 1 illustrates the radial compression of a plastic closure in a reducing die just prior to inserting the closure in the open end of an electrochemical cell container.

Referring to the drawings, FIG. 1 illustrates the radial compression of a plastic closure 10 in a reducing die 11 prior to inserting the closure 10 in the open end of an electrochemical cell container 12. The container 12 is held in place by a sleeve 13 while a plunger 14 pushes the plastic closure 10 through the reducing die 11 to develop a radial compressive force in the closure 10. A metallic terminal member 15 is molded or forced into place in the plastic closure 10 to make electrical contact with one of the electrodes of the electrochemical cell. It is preferred that the plastic closure 10 also contain a nonpolar, metallic insert 16 to reinforce and strengthen the closure to withstand the substantial pressure which may be developed within the electrochemical cell container 12.

When the plunger 14 pushes the plastic closure 10 out of the reducing die 11, the closure 10 instantaneously expands into contact with the metallic container 12, and preferably, the bottom of the closure 10 is in contact with a bead 17 which is rolled into the container 12. In the event the closure 10 does not contact the bead 17, it will be pushed into contact with the bead during the subsequent crimping operation.

Figure 2:
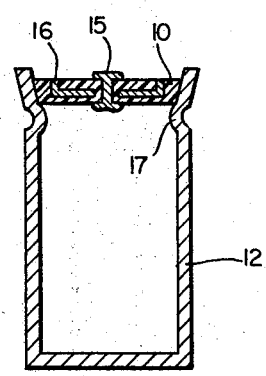
FIG. 2 illustrates the outward deformation of the upper edge of the cell container after the radially compressed plastic closure has been inserted into the container and has expanded into contact with the container wall.

As the plastic closure 10 is pushed through the reducing die 11, the closure is radially compressed and a substantial force is developed in the plastic closure. It is preferred that this force be of sufficient magnitude that the upper edge of the container will be deformed outwardly after the container and the radially compressed plastic closure inserted therein are removed from the sleeve 13. The outward deformation of the upper edge of the cell container is illustrated in FIG. 2. This deformation may or may not be permanent deformation of the metallic container. The force developed in the plastic closure can be varied depending upon the size of the reducing die which controls the extent to which the plastic closure is radially compressed, i.e. a smaller die will increase the radial compressive force. Although some of the radial force in the plastic closure 10 is relieved by the deformation in the metallic container 12, the radial force is substantially reestablished in the plastic closure during the subsequent crimping operation.

Figure 3:
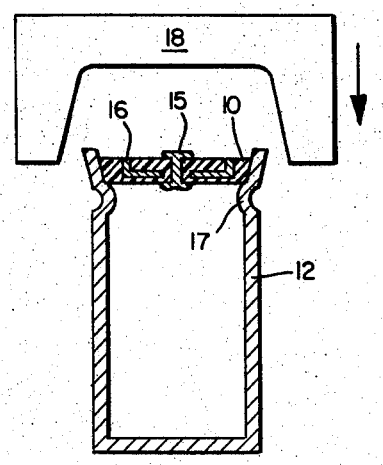
FIG. 3 illustrates the same container and plastic closure as in FIG. 2 and a closing die just prior to crimping the upper edge of the container over upon the top of the plastic closure.

FIG. 3 illustrates the deformed container and the plastic closure shown in FIG. 2, and a tapered closing die 18 which is used to crimp the upper edge of the container 12 over upon the top of the plastic closure 10. The tapered closing die 18 is brought into contact with the top of the metallic container 12, and the top of the container is axially compressed upon the top of the plastic closure. The tapered closing die also radially compresses the side of the metallic container to substantially its original shape prior to inserting the plastic closure. The axial compression develops an axial force in the plastic closure which is compressed between the bead 17 rolled into the container and the top edge of the container. The axial compression also increases the radial force exerted by the plastic closure upon the container side wall. In addition, the crimping of the top of the container upon the plastic closure increases the sealing surface between the container and the closure by forming both an axial and radial sealing area. In this manner, the plastic closure exerts both a radial and axial force against the metallic container and provides a more effective seal.

Figure 4:
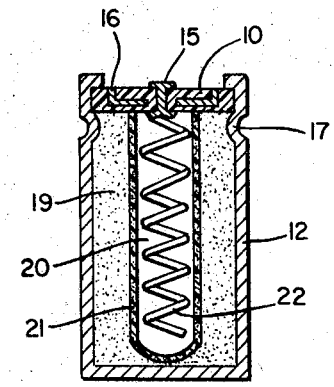
FIG. 4 illustrates an electrochemical cell sealed by a plastic closure which exerts both a radial and an axial force against the cell container in accordance with this invention.

FIG. 4 illustrates an electrochemical cell sealed by a plastic closure 10 which exerts both a radial and an axial force against a cell container 12. The electrochemical cell comprises a cathode mix 19, an anode-electrolyte gel mixture 20 and a separator 21 between the cathode 19 and the anode 20. A metallic collector element 22 in the form of a spring is disposed within the anode 20, and the collector element 22 is welded or otherwise connected to the terminal member 15. A nonpolar, metallic insert 16 is also present in the plastic closure 10. Though not limited thereto, the cathode active material may comprise manganese dioxide ($MnO_2$), the anode active material may be amalgamated zinc particles dispersed in an alkaline electrolyte-carboxy methylcellulose gel, and the separator may be cellophane.

As illustrated in FIGS. 1-4, the plastic closure 10 completely seals the cell, and there is no provision for venting gases which may be generated within the cell container. It is within the scope of this invention to provide a vent in the plastic closure, but since a vent is not critical to the invention, it has not been shown in the drawings.

The following examples describe electrochemical cells sealed with a plastic closure in accordance with this invention:

EXAMPLE I

An electrochemical cell of the C size was sealed in accordance with the method of this invention. The beaded container 12 was nickel-plated cold rolled steel having a thickness of 11 mils and an outside diameter of 0.975 inch. A circular nylon closure 10 made of Zytel 101 nylon was used to close the container. The closure contained a circular, cold rolled steel metal insert 16 and a metallic terminal member 15. The metal insert had a thickness of 25 mils, a height of 0.09 inch and an outer diameter of 0.896 inch. The uncompressed nylon closure had an outer diameter of 0.958 inch, and the inside diameter of the container at the open end was 0.952 inch.

The nylon closure was inserted into a reducing die 11 to develop a radial compressive force in the closure and for placing the closure into the container. The reducing die had an inside diameter at its lower end of 0.948 inch, and the outer diameter of the compressed nylon closure was equivalent to this reducing die diameter as it was pushed into the container.

When the nylon closure was pushed out of the reducing die, it instantaneously expanded into contact with the beaded container. The radial compressive force developed in the nylon closure by the reducing die was of sufficient magnitude that the upper edge of the container was deformed outwardly. Prior to insertion of the nylon closure, the outside diameter of the beaded container was 0.975 inch, and after insertion of the closure, the outside diameter of the beaded container had expanded to 0.977 inch.

The beaded container with the nylon closure inserted therein was placed in a tapered closing die 18 for the purpose of axially crimping the upper edge of the container over upon the top of the nylon closure. An axial crimping force of 1.5 tons was used to complete the radial-axial sealing of the beaded container. The percent radial compression on the seal member, i.e. the portion of the nylon between the beaded container and the metal insert, was calculated by determining the difference between the uncompressed and compressed diameter of the nylon closure divided by the uncompressed diameter of the nylon closure, and for this particular C size cell it was 5%.

EXAMPLE II

An electrochemical cell of the D size was sealed in accordance with the method of this invention. The beaded container was nickel-plated cold rolled steel having a thickness of 13 mils and an outside diameter of 1.293 inches. A circular nylon closure made of Zytel 101 nylon was used to close the beaded container. The nylon closure contained a circular, cold rolled steel metal insert and a metallic terminal member. The metal insert had a thickness of 25 mils, a height of 0.09 inch and an outer diameter of 1.213 inches. The uncompressed nylon closure had an outer diameter of 1.279 inches and the inside diameter of the container at the open end was 1.265 inches.

The nylon closure was inserted into a reducing die to develop a radial compressive force in the closure and for placing the closure into the container. The reducing die had an inside diameter at its lower end of 1.261 inches, and the outer diameter of the compressed nylon closure was equivalent to this reducing die diameter as it was pushed into the container.

When the nylon closure was pushed out of the reducing die, it instantaneously expanded into contact with the beaded container. The radial compressive force developed in the nylon closure by the reducing die was of sufficient magnitude that the upper edge of the container was deformed outwardly. Prior to insertion of the nylon closure, the outside diameter of the beaded container was 1.293 inches, and after insertion of the closure, the outside diameter of the beaded container had expanded to 1.295 inches.

The beaded container with the nylon closure inserted therein was placed in a tapered closing die for the purpose of axially crimping the upper edge of the container over upon the top of the nylon closure. An axial crimping force of 1.5 tons was used to complete the radial-axial sealing of the beaded container. The percent radial compression on the seal member was determined to be 15% for this particular D size cell.

Having completely described this invention, what is claimed is:

1. A method for sealing an electrochemical cell which comprises an anode, a cathode, electrolyte and a separator, all disposed within a metallic container having an open end, a bead formed in said container near said open end and a hard, cold-flow resistant plastice closure member sealing said open end; said method comprising pushing said plastic closure member, which is larger than said open end, through a reducing die to develop a radial force in the plastic closure and into the open end of said metallic container where said plastic closure member expands into contact with said metallic container; outwardly deforming the upper wall of said metallic container above said bead by means of said radial force in the plastic closure; and axially compressing the upper edge of said metallic container which is crimped over upon the upper surface of said plastic closure member by means of a tapered closing die, whereby said plastic closure member exerts both an axial and a radial force against said metallic container and forms both an axial and radial sealing area.

2. The method of claim 1 in which the metallic container has a cylindrical shape and the plastic closure member has a circular horizontal cross-section.

3. The method of claim 1 in which the plastic closure member contains a metallic terminal member and a metallic reinforcing insert and is made from a hard nylon material.

4. The method of claim 1 in which the plastic closure member is pushed into contact with the bead in the metallic container when it is pushed out of the reducing die.

References Cited

UNITED STATES PATENTS

| | | | |
|---|---|---|---|
| 3,068,312 | 12/1962 | Daley et al. | 136—133 |
| 3,069,489 | 12/1962 | Carmichael et al. | 136—133 |
| 3,223,559 | 12/1965 | Carmichael et al. | 136—175 |
| 3,427,202 | 2/1969 | Wilke | 136—133X |

WINSTON A. DOUGLAS, Primary Examiner

A. SKAPARS, Assistant Examiner

U.S. Cl. X.R.

136—169